United States Patent [19]

Baer

[11] 4,207,483
[45] Jun. 10, 1980

[54] STEP MOTOR WITH CIRCUMFERENTIAL STATORS ON OPPOSITE SIDES OF DISC-LIKE ROTOR

[75] Inventor: John S. Baer, Bar Harbor, Me.

[73] Assignee: Warner Electric Brake & Clutch Co., Beloit, Wis.

[21] Appl. No.: 938,925

[22] Filed: Sep. 1, 1978

[51] Int. Cl.² ............................................. H02K 37/00
[52] U.S. Cl. .................................. 310/49 R; 310/164; 310/268
[58] Field of Search ................ 310/49, 162, 165, 156, 310/257, 41, 268

[56] References Cited

U.S. PATENT DOCUMENTS

| | | | |
|---|---|---|---|
| Re. 28,075 | 7/1974 | Kavanaugh | 310/49 |
| 2,428,882 | 10/1947 | Kolft | 310/49 |
| 2,539,144 | 1/1951 | Kuhlmann | 310/49 |
| 2,814,746 | 11/1957 | Boerdijk | 310/164 |
| 3,205,383 | 9/1968 | Hurst | 310/257 X |
| 3,219,862 | 11/1968 | Kieffert | 310/257 X |
| 3,508,091 | 4/1970 | Kavanaugh | 310/49 |
| 3,652,884 | 3/1972 | Vuffray | 310/257 X |
| 3,783,313 | 1/1974 | Mathar | 310/49 |
| 3,784,850 | 1/1974 | Inaba et al. | 310/49 |
| 3,845,338 | 10/1974 | Oguey | 310/49 |
| 4,104,552 | 8/1978 | Tsergas | 310/164 X |

*Primary Examiner*—Donovan F. Duggan
*Attorney, Agent, or Firm*—Leydig, Voit, Osann, Mayer & Holt, Ltd.

[57] ABSTRACT

An electric step motor has a rotor member and a stator member aligned on a common axis with one of the two members having two pairs of interdigital pole teeth extending perpendicularly to the axis. The two pairs of pole teeth are axially spaced from each other with the inner pole teeth in each pair spaced both radially and circumferentially from the outer pole teeth in that pair. A pair of coils are associated with the two pairs of interdigital pole teeth for magnetizing the inner and outer pole teeth in each pair with opposite polarities when the corresponding coil is energized. The other member has multiple permanent magnets spaced circumferentially from each other and located axially between the two pairs of interdigital pole teeth so that energization of either coil draws the permanent magnets into register with a selected pair of interdigital pole teeth. The permanent magnets are polarized in the axial direction with each adjacent pair of the permanent magnets preferably polarized in opposite directions, and the pole teeth in one of the two interdigital pairs are preferably circumferentially offset from the pole teeth in the other pair.

22 Claims, 13 Drawing Figures

(ONE COIL ON AT A TIME)

(TWO COILS ALWAYS ON)

STEP MOTOR WITH CIRCUMFERENTIAL STATORS ON OPPOSITE SIDES OF DISC-LIKE ROTOR

DESCRIPTION OF THE INVENTION

The present invention relates generally to electric step motors and, more particularly, to step motors which include a circumferential array of permanent magnets cooperating with circumferential arrays of electromagnetic poles whose polarization is controlled by energization of at least two different coils to produce stepping movement of the rotor.

It is a primary object of the present invention to provide an improved step motor which provides a relatively high output torque for any given outside diameter or volume.

It is another object of this invention to provide such an improved step motor which can be mass produced at a relatively low cost, and without the use of complex tooling.

A further object of the invention is to provide such an improved step motor which provides positive detenting when the motor is turned off, so that the motor maintains its output shaft at the same position held by the shaft just before the motor is turned off.

Yet another object of the invention is to provide such an improved step motor which has a relatively simple construction and long operating life.

Other objects and advantages of the invention will be apparent from the following detailed description and the accompanying drawings, in which:

FIG. 3a is an enlarged fragmentary section showing the two pairs of stator pole teeth and the cooperating permanent magnet regions in the motor as shown in FIG. 3;

FIG. 4a is an enlarged fragmentary section showing the two pairs of stator pole teeth and the cooperating permanent magnet regions in the motor as shown in FIG. 4;

Although the invention will be described in connection with certain preferred embodiments, it will be understood that it is not intended to limit the invention to these particular embodiments. On the contrary, it is intended to cover all alternatives, modifications and equivalents as may be included within the spirit and scope of the invention as defined by the appended claims.

Figure 1:
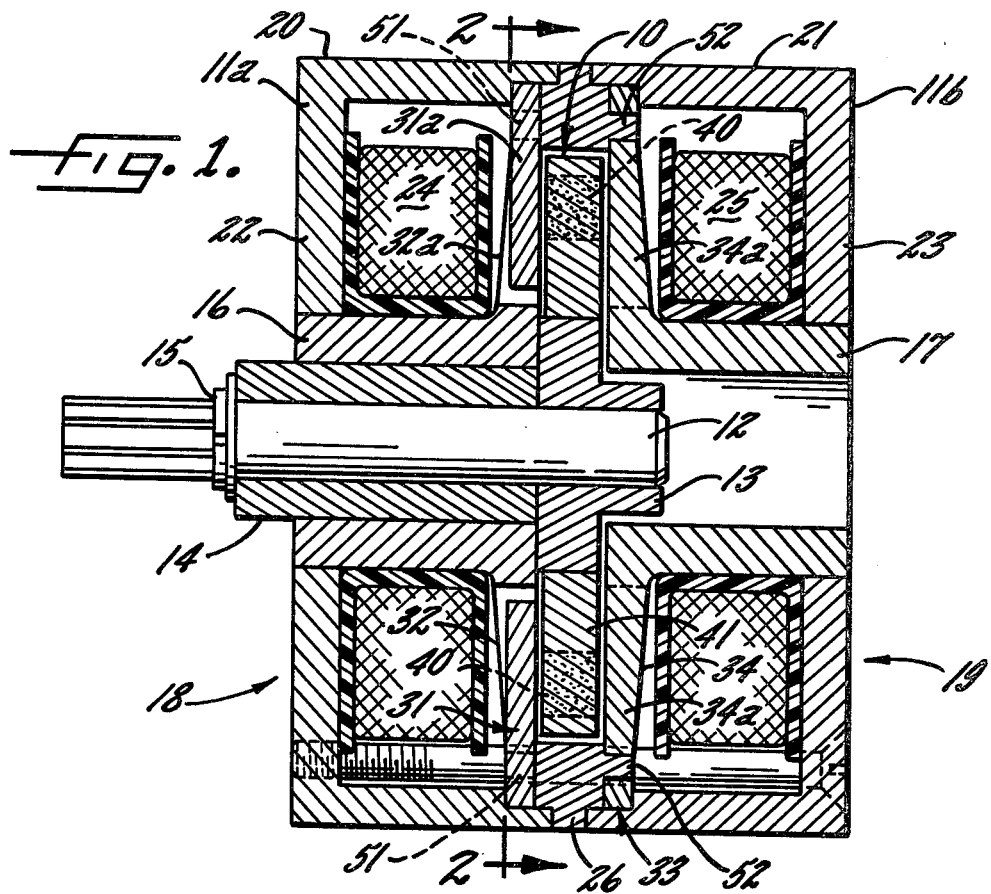
FIG. 1 is a longitudinal section of a step motor embodying the invention.
Figure 2:
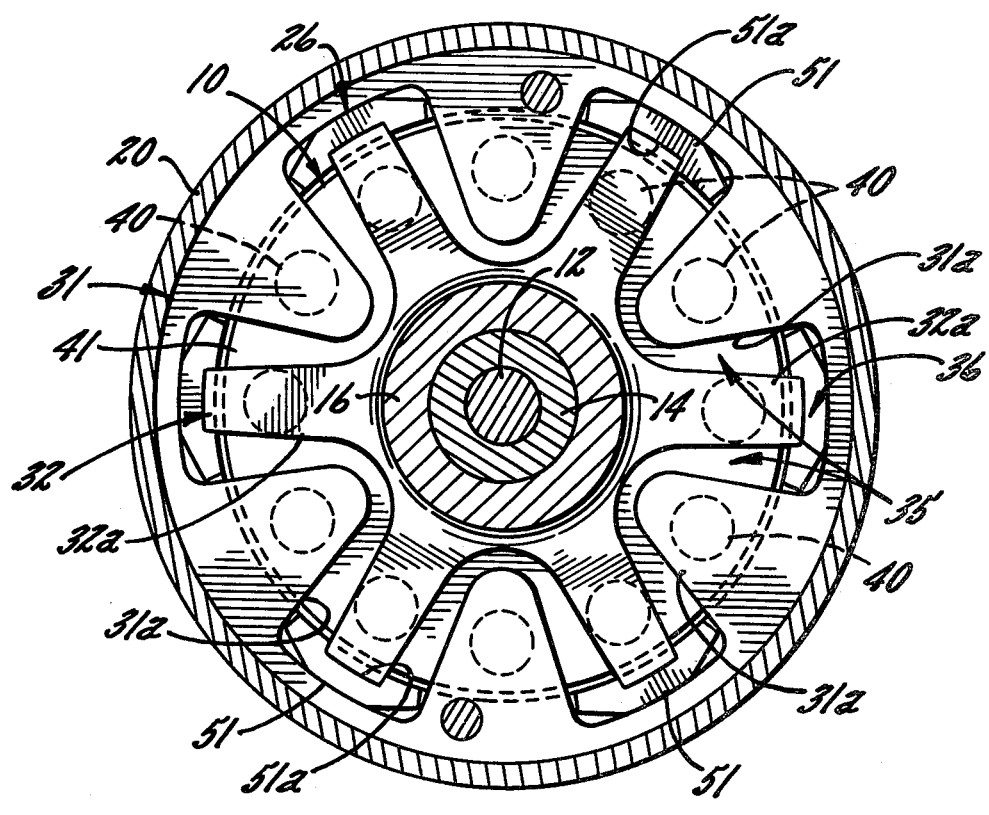
FIG. 2 is a section taken generally along line 2—2 in FIG. 1.

Turning now to the drawings, the exemplary step motor shown in FIGS. 1 and 2 includes as its major components a rotor 10 and a two-part stator 11 comprising a left-hand section 11a and a right-hand section 11b. The rotor 10 and the two stator sections 11a and 11b are all concentrically aligned with the axis of a shaft 12, with the rotor 10 being carried on a non-magnetizable hub 13 affixed to the end of the shaft 12. From the hub 13, the shaft 12 extends through a non-magnetizable bearing sleeve 14 within the stator section 11a. A snap ring 15 inserted in a groove in the splined outer end of the shaft 12 holds the shaft in a fixed axial position with the hub 13 riding on the inner end of the bearing sleeve 14.

The inside surfaces of the two stator sections 11a and 11b are formed by inside cylinders 16 and 17 which are made of a magnetically permeable material such as soft iron. Surrounding the cylinders 16 and 17 are corresponding shells 18 and 19 which form a pair of outside cylinders 20 and 21 and integral end walls 22 and 23. The spaces between the two pairs of cylinders 16, 20 and 17, 21 are occupied by a pair of coils 24 and 25 which are energized in a controlled manner to magnetize multiple sets of interdigital stator poles extending perpendicularly to the motor axis, as will be described in more detail below. The two stator sections 11a and 11b are separated by a spacer ring 26 made of a non-magnetizable material such as aluminum, and which also serves to position the outer pole teeth of the two stator sections in the desired angular or circumferential positions.

In accordance with one important aspect of the present invention, the inner and outer pole teeth in each stator section are spaced both radially and circumferentially from each other so that the inner and outer teeth can be magnetized with opposite polarities when the corresponding coil is energized, and the rotor is provided with multiple permanent magnets spaced circumferentially from each other and located between the two pairs of interdigital pole teeth of the stator sections so that energization of either coil draws the permanent magnets into register with the stator pole teeth associated with the energized coil, the permanent magnets being polarized in the axial direction with each adjacent pair of magnets being polarized in opposite directions. Thus, in the illustrative embodiment, the opposed ends of the two shells 18 and 19 receive two pairs of coplanar flat annuli 31, 32, and 33, 34 which form the two axially spaced pairs of interdigital pole teeth 31a, 32a and 33a, 34a extending perpendicularly to the motor axis. All four annuli 31–34 are made of magnetically permeable material such as soft iron. The two outside annuli 31 and 33 form six outside teeth 31a, 33a and fit into complementary inside grooves formed in the open ends of the two shells 18 and 19 to provide low-reluctance circuits for the flow of magnetic flux induced in the outside cylinders 20 and 21 by the respective coils 24 and 25. The two inside annuli 32 and 34 form six inside teeth and are formed as integral parts of the two inside cylinders 16 and 17 to provide low-reluctance circuits for magnetic flux induced in the inside cylinders 16 and 17 by the respective coils 24 and 25.

Figure 3:
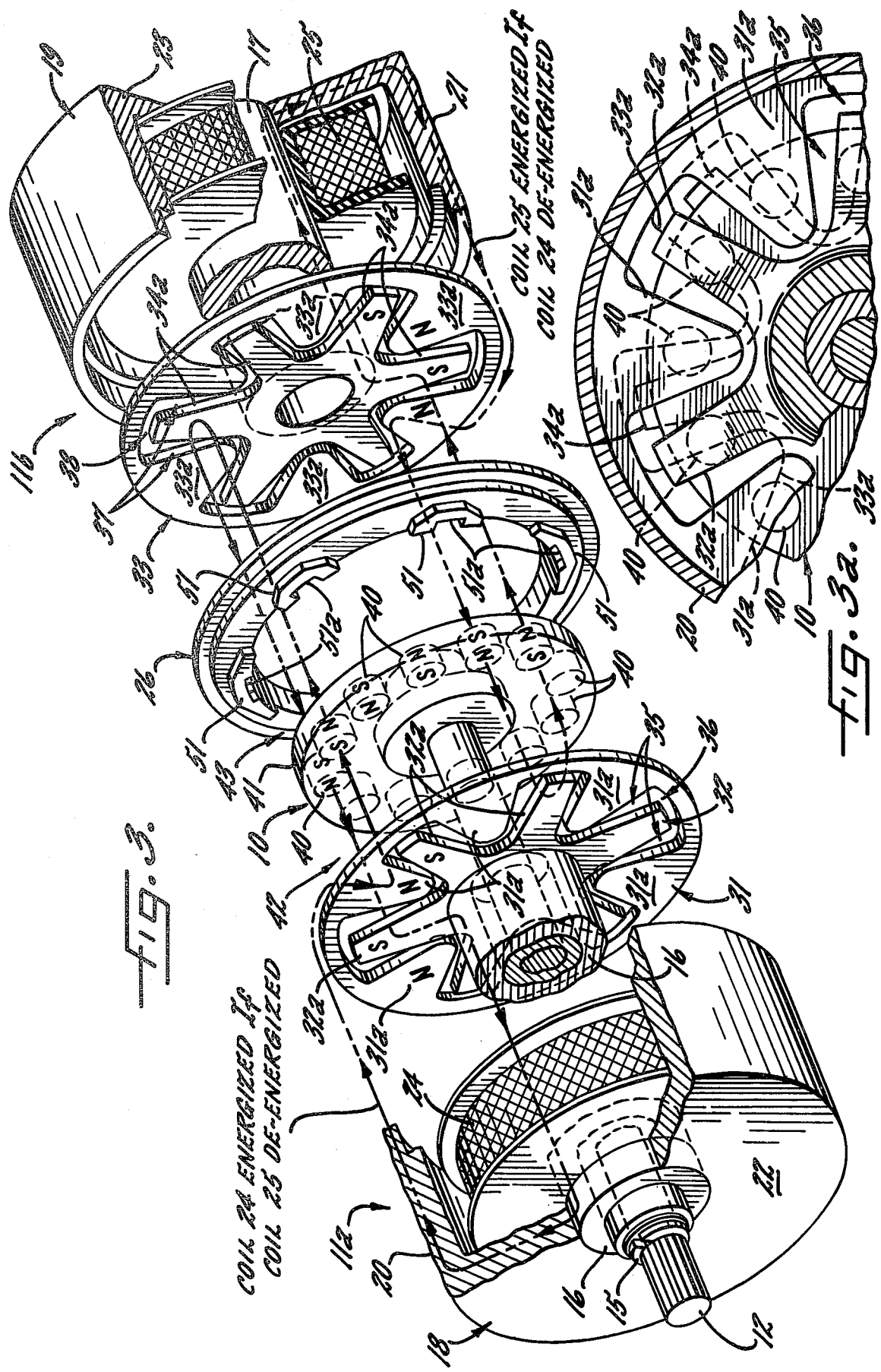
FIG. 3 is an exploded perspective view of the step motor of FIGS. 1 and 2 with the rotor in a first position, with fragments thereof broken away to show the internal structure, and with two different flux loops illustrated schematically.
Figure 4:
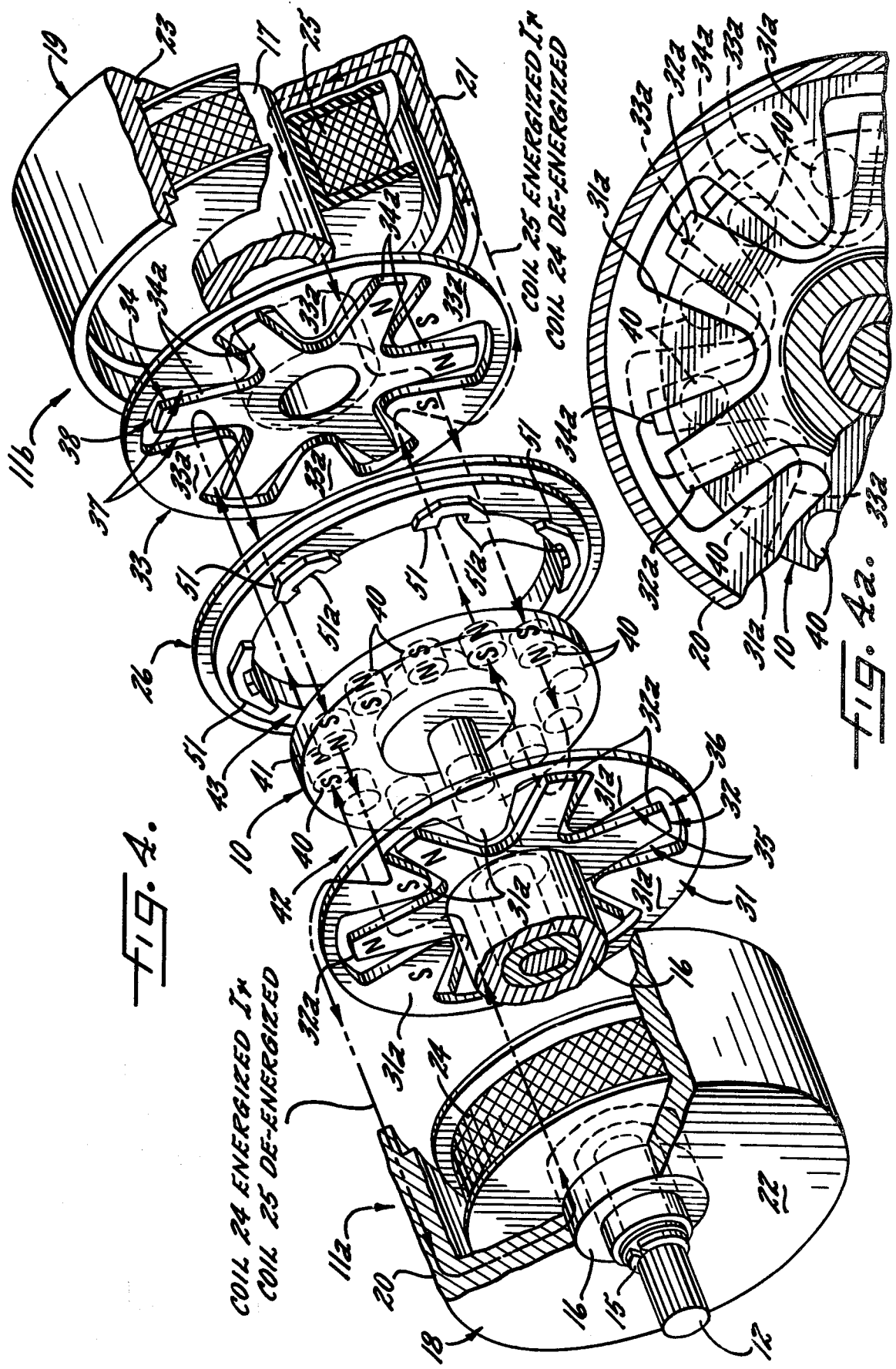
FIG. 4 is the same perspective view shown in FIG. 3 but with the rotor in a different position and schematically illustrating two different magnetic flux loops.

In order to minimize the leakage of magnetic flux between the inner and outer pole teeth 31a, 32a or 33a, 34a of either stator section, the opposed surfaces of the teeth formed by the two pairs of annuli 31, 32 and 33, 34 are continuously spaced from each other in both the radial and circumferential directions. More specifically, the teeth 31a and 32a are separated circmferentially by radially-lengthwise gaps 35 and radially by circumferentially-lengthwise gaps 36, and the teeth 33a and 34a are separated by circumferentially by radially-lengthwise gaps 37 and radially by circumferentially-lengthwise gaps 38 (FIGS. 3 and 4). The air gaps produced by this spacing are sufficiently large to cause most of the magnetic flux to flow between the stator pole teeth and either the associated cylinders 16, 17, 20 and 21 or the permanent magnets in the adjacent rotor 10, rather than between adjacent pole teeth. In the particular embodiment illustrated, it will be noted that each stator section includes a total of 12 interdigital pole teeth equally spaced around the circumference, but it will be understood that different numbers of pole teeth may be used to achieve different stepping angles.

Turning next to the rotor 10, 12 permanently magnetized (PM) regions 40 are equally spaced around the circumference of a unitary ceramic ring 41 affixed to the hub 13. The centers of the PM regions 40 are located at about the same radial distance from the motor axis as the radial centers of the interdigital stator pole teeth 31a–34a on opposite sides of the rotor. Thus, a pair of working flux gaps 42 and 43 are formed between the opposite axial ends of the PM regions 40 and the adjacent faces of the pole teeth 31a–34a. The PM regions 40 are all magnetized in the axial direction, with each adjacent pair of PM regions being polarized in opposite directions as indicated by the north and south poles "N" and "S" indicated in FIG. 3. If desired, the permanent magnets can be preformed and mounted in a non-magnetizable carrier secured to the hub 13.

Surrounding the rotor 10 in the spacer ring 26 which magnetically isolates the outside cylinders 20 and 21 of the two stator sections 11a and 11b so that magnetic flux passing between the two stator sections must pass through the PM regions 40 of the rotor. The spacer ring 26 also forms a series of six circumferentially spaced alignment members 51 and 52 projecting laterally from opposite side surfaces of the ring into the spaces between the inside and outside pole teeth in each stator section. These alignment members 51 and 52 serve to hold the two pairs of outside and inside pole members 31, 32 and 33, 34 in precisely the desired circumferential positions relative to each other. The members 51 and 52 are dimensioned to fit snugly between respective pairs of the outside teeth 31a and 33a to hold the outside pole members 31 and 33 in position. To hold the inside pole members 32 and 34, the inside surface of each of the alignment members 51 and 52 forms a central recess 51a or 52a which receives and holds the tip of one of the inside pole teeth 32a and 34a.

It will be appreciated that each adjacent pair of pole teeth in each of the two circular arrays of interdigital stator pole teeth 31a, 32a and 33a, 34a will always have opposite polarities because the inner and outer sets of teeth are coupled to radially opposite surfaces of the coils 24 and 25. The coils are wound circularly about the motor axis so that magnetic flux induced in the adjacent cylinders 16, 20 and 17, 21 is in axially opposite directions at the radially inner and outer surfaces of the coils. Thus, the magnetic flux induced in the inside cylinders 16 and 17 always has a polarity opposite that of the flux induced in the outside cylinders 20 and 21. Consequently, the inside and outside sets of pole teeth in each interdigital pair will always have opposite polarities, with the nature of those polarities (i.e., north poles on the outside and south poles on the inside, or vice versa) depending on the direction of current flow within the associated coil 24 or 25. As will be described in more detail below, an appropriate switching circuit is provided to reverse the direction of current flow each time one of the coils 24 and 25 is energized to control the direction of stepping movement of the rotor 10.

Whenever the coil 24 or 25 in one of the stator sections is energized, that section attracts the PM regions 40 of the rotor 10 into register with the closest (in the circumferential direction) stator pole teeth of opposite polarity. For example, when the stator section 11a is energized to produce the polarities indicated on the pole teeth 31a and 32a in FIG. 3, magnetic flux induced in the outside cylinder 20 passes into the outside (north) stator pole teeth 31a, and then into adjacent south poles of alternate PM regions 40 of the rotor 10. At the same time, magnetic flux induced in the inside cylinder 16 is joined by flux passing from the north poles of the intervening PM regions 40 into the inside (south) stator pole teeth 32a, and thence into the inside cylinder 16. From the cylinder 16, the flux passes through the end wall 22 of the shell 18. This pattern of magnetic flux, which is illustrated schematically in the upper half of FIG. 3, holds the rotor 19 in this "detent" position until some change occurs in the energization of one or both of the coils 24 and 25.

In accordance with a further aspect of the present invention, the pole teeth in one of the two pairs of interdigital pole teeth are circumferentially offset from the pole teeth in the other pair by one-half pole pitch. Thus, in the illustrative embodiment each stator unit includes a total of 12 pole teeth (six outside teeth and six inside teeth) so that the pole pitch is 30°; and the pole teeth 33a and 34a of the right-hand stator section are offset from the corresponding pole teeth 31a and 32a of the left-hand section by 15°. It will also be noted that the pitch of the PM regions 40 in the rotor 10 is the same as that of each pair of stator teeth, namely 30°. Consequently, whenever the PM regions 40 of the rotor 10 are in register with one pair of interdigital pole teeth, the other pair of interdigital pole teeth are in register with the spaces between the PM regions 40. For example, in the rotor position illustrated in FIG. 3, which is shown more clearly in FIG. 3a, the PM regions 40 are in register with the left-hand stator teeth 31a and 32a, so the right-hand stator teeth 33a and 34a are in register with the spaces between the PM regions 40. In FIGS. 4 and 4a, the PM regions 40 are shown in register with the right-hand stator teeth 33a and 34a, so the left-hand stator teeth 31a and 32a are in register with the spaces between the PM regions.

This radial offset between the two pairs of rotor teeth provides a significant advantage in that one of the interdigital sets of stator pole teeth always provides an efficient return path for magnetic flux passing between the other interdigital set and the PM regions of the rotor, as illustrated by the magnetic flux lines in FIGS. 3 and 4. For example, it can be seen that the return path for the upper flux loop in FIG. 3 is provided by the inside stator pole teeth 34a, which is a considerably lower reluctance return path than that afforded by the "back iron" represented by the inside cylinder 17 and the shell 19. Similarly, in the lower flux loop shown in FIG. 3, the return path for the flux is provided by the inside teeth 32a, which provide a lower reluctance path than the "back iron" represented by the inside cylinder 16 and the shell 18.

It will be noted that the four flux loops shown schematically in FIGS. 3 and 4 illustrate four different operating conditions which are created sequentially to cause the rotor 10 to move in successive 15° steps. More specifically, the upper flux loop in FIG. 3 represents a condition in which the coil 24 is energized with the current flowing in a first or "forward" direction ($I_f$); the lower flux loop in FIG. 3 represents a condition in which the coil 25 is energized with the current flowing in a first or "forward" direction ($I_f$); the upper flux loop in FIG. 4 represents a condition in which the coil 24 is energized with the current flowing in a second or "reverse" direction ($I_r$); and the lower flux loop in FIG. 4 represents a condition in which the coil 25 is energized with the current flowing in a second or "reverse" direction ($I_r$). To illustrate these four conditions even more clearly, "linearized" side elevations of representative stator pole teeth 31a, 32a and 33a, 34a and PM regions 40 are shown in FIGS. 5 through 8 for each of the four conditions. It should be noted that the conditions illustrated by the lower flux loop in FIG. 3 and the upper flux loop in FIG. 4 do not correspond to the actual physical positions of the rotor 10 in these figures, and are included only to show the path of the flux loop when the rotor is displaced 15° from the rotor positions actually shown in these figures.

In this preferred embodiment of the invention as illustrated in FIGS. 3-8, the rotor 10 is stepped in 15° increments by successively de-energizing the previously energized coil, and energizing the other coil to advance the rotor in increments of one-half tooth pitch. Furthermore, each time a coil is energized, the flow of energizing current is in the opposite direction from the previous energization of the same coil. Thus, when the rotor 10 is dwelling at the position illustrated in FIGS. 3, 3a and 5 due to energization of the coil 24 and it is desired to step the rotor in the clockwise direction, the coil 24 is de-energized and the coil 25 is energized with the current flowing in a direction to induce south poles in the outside teeth 33a and north poles in the inside teeth 34a (see FIGS. 4, 4a and 6 and the lower flux loop in FIG. 4). This causes the rotor to step 15° in the clockwise direction so as to bring the north and south poles on the right-hand surfaces of the PM regions 40 into register with the south and north poles, respectively, of the interdigital pole teeth 33a and 34a of the newly energized stator section.

Similarly, if it were desired to step the rotor 10 in the counterclockwise direction rather than the clockwise direction, the coil 24 would be de-energized and coil 25 would be energized with the current flowing in a direction to induce the north poles in the outside teeth 33a and south poles in the inside teeth 34a. This would cause the rotor to step 15° in the counterclockwise direction so as to bring the north and south poles on the right-hand surfaces of the PM regions 40 into register with the south and north poles, respectively, of the interdigital pole teeth 33a and 34a.

Figure 7:
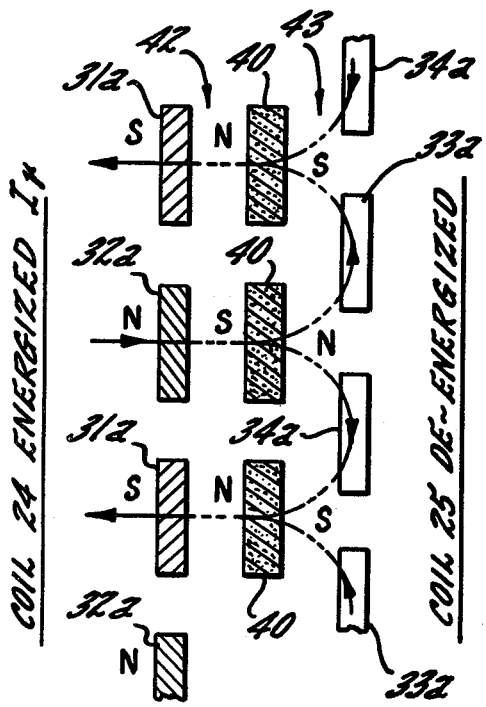
FIG. 7 is a somewhat schematic and linearized side view of portions of the rotor and stator pole teeth in the step motor of FIG. 1 in a third energized state, with the resulting magnetic flux paths illustrated schematically.

The third condition, illustrated by FIG. 7 and the upper flux loop in FIG. 4, causes the rotor to step another 15° in the clockwise direction. This step is effected by de-energizing the coil 25 and energizing coil 24 with the current flowing in a direction opposite that illustrated in FIG. 5, thereby inducing south poles in the outside teeth 31a and north poles in the inside teeth 32a. In order for the north and south poles on the left-hand surfaces of the PM regions 40 to be brought into register with this new polar alignment on the stator pole teeth 31a and 32a, the rotor 10 must step 15° in the clockwise direction.

The resulting position of the rotor relative to the two sets of interdigital pole teeth appears the same as in the first condition (see FIG. 3a), but the polarities of the teeth 31a and 32a are reversed. The rotor will then remain in this new detent position until some further change occurs in the energization of the coils 24 and 25.

Figure 8:
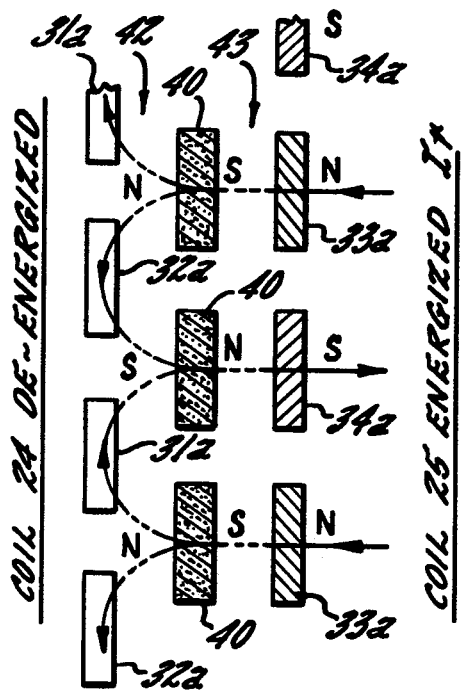
FIG. 8 is a somewhat schematic and linearized side view of portions of the rotor and stator pole teeth in the step motor of FIG. 1 in a fourth energized state, with the resulting magnetic flux paths illustrated schematically.

The next clockwise step of the rotor 10 is effected by the polarization pattern illustrated in FIG. 8 and the lower flux loop in FIG. 3. In this condition, the coil 24 is de-energized and the coil 25 is energized, but with the current flowing in a direction opposite that illustrated in FIG. 6. Consequently, north poles are induced in the outside teeth 33a, and south poles are induced in the inside teeth 34a. This causes the rotor to step another 15° in the the clockwise direction so as to bring the north and south poles on the right-hand surfaces of the PM regions into register with the south and north poles, respectively, of the teeth 33a and 34a of the newly energized stator section. The rotor is thus brought into the same position shown in FIG. 4a, relative to the two sets of interdigital pole teeth, but with the polarities of the teeth reversed from those produced by the lower flux loop in FIG. 4 in the "second" condition.

Figure 5:
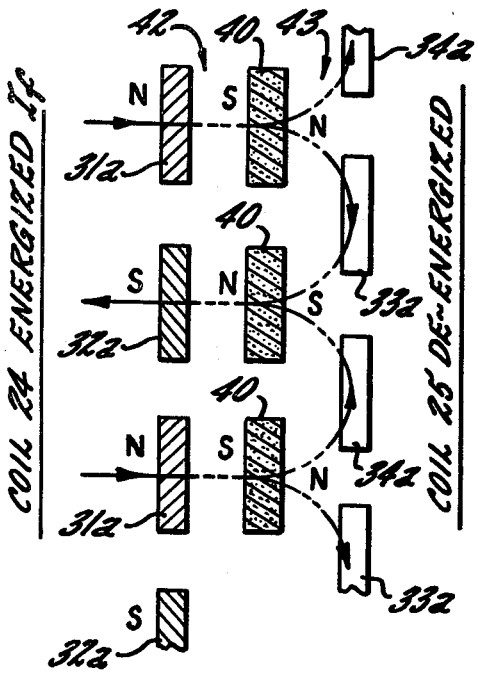
FIG. 5 is a somewhat schematic and linearized side view of portions of the rotor and stator pole teeth in the step motor of FIG. 1 in a first energized state, with the resulting magnetic flux paths illustrated schematically.
Figure 6:
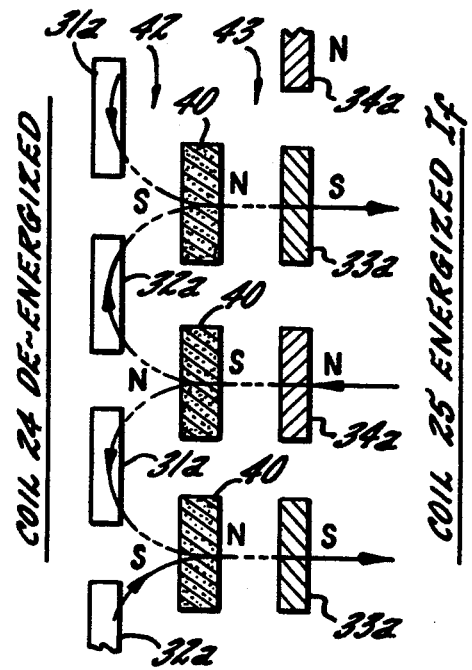
FIG. 6 is a somewhat schematic and linearized side view of portions of the rotor and stator pole teeth in the step motor of FIG. 1 in a second energized state, with the resulting magnetic flux paths illustrated schematically.

This completes one full cycle of the four possible conditions in the preferred mode of operation of the illustrative motor, and the next rotor step is effected by returning to the first condition illustrated in FIG. 5 and the upper flux loop in FIG. 3, which has already been described above.

One of the advantages of the step motor of this invention is that it maintains a stable detent position even when the coils 24 and 25 are both de-energized. Thus, the minimum-magnetic-reluctance or detent position of the rotor when either of the coils 24 or 25 is energized is also the detent position when the coils are both de-energized and the only sources of magnetic flux are the PM regions 40 of the rotor. This can be seen most clearly in FIGS. 5-8 where that PM regions 40 are in full alignment with one of the two pairs of stator teeth 31a, 32a or 33a, 34a in each of the four possible detent positions produced by energization of one of the coils 24 and 25. These are the positions of minimum magnetic reluctance for the passage of magnetic flux between the north and south poles of the PM regions 40, regardless of whether the coils 24 and 25 are on or off. Consequently, whenever the motor is turned off, i.e., both coils 24 and 25 are de-energized, the PM regions 40 hold the rotor 10 in a stable position without shifting in either direction, although the holding torque is weaker than the holding torque produced when one or both of the coils are energized.

Another advantage of the preferred embodiment of the invention, in which the pole teeth in one of the interdigital pairs are radially offset from the pole teeth in the other pair by one-half pole pitch, is that the holding torque is maximized in both the energized and de-energized state of the motor. This is due to the fact that one of the two sets of interdigital pole teeth is always in register with the spaces between the PM regions 40, thereby providing a low-reluctance return path for the magnetic flux passing between the north and south poles of the PM regions 40 of the rotor. This low-reluctance path is to be contrasted with the path that the flux would follow if the two pairs of stator pole teeth were aligned with each other; in this case the flux would always have to pass through the longer and higher reluctance path formed by the inside and outside bylinders 16, 20 and 17, 21 and the end walls 22, 23 on both sides of the rotor. This would be true in both the on and off conditions of the motor. However, by radially offsetting the two pairs of stator pole teeth from each other, the flux path is always reduced on one side of the rotor, as can be seen from the flux patterns illustrated in FIGS. 3-8. This maximizes the strength of the magnetic field in the working flux gaps 42 and 43, which maximizes not only the holding torque but also the dynamic output torque of the motor. Moreover, this high output torque is achieved with a relatively small outside diameter and overall volume.

Figure 9:
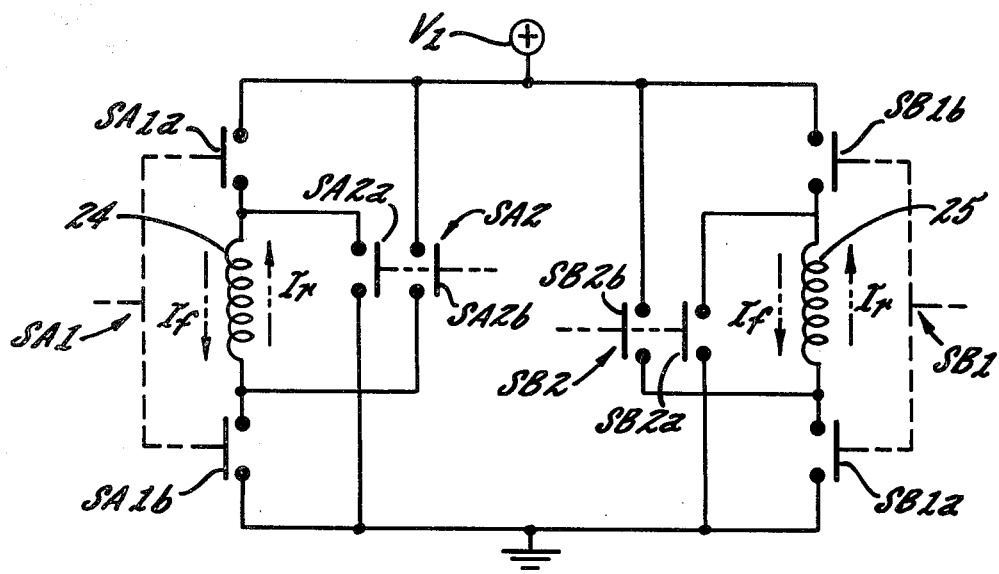
FIG. 9 is a schematic circuit diagram of a switching circuit for controlling energization and de-energization of the two coils in the step motor of FIG. 1.

A circuit for controlling energization and de-energization of the coils 24 and 25 from a voltage source V1 is shown in simplified form in FIG. 9. While the switching devices SA1, SA2, SB1, and SB2 in this circuit will usually be in the form of transistors or other solid state devices adapted to be rendered conductive and non-conductive in response to control signals, the switching devices are illustrated in FIG. 9 simply as on-off switches adapted to be sequentially closed and opened. Switches SA1 and SA2 control the current flow through coil 24, while switches SB1 and SB2 control the current flow through coil 25.

It can be seen that there are two possible connections for each of the two coils 24 and 25. When switch SA1 is closed and the other three switches SA2, SB1, and SB2 are open, the coil 24 is energized with current $I_f$ flowing downwardly through the coil as viewed in FIG. 9 to produce the "first" flux pattern illustrated in FIG. 5 and by the upper flux loop in FIG. 3. To de-energize the coil 24 and energize coil 25 with current $I_f$ flowing downwardly through the coil, the switch SA1 is opened, switch SB1 is closed, and the other two switches SA2 and SB2 remain open. This produces the "second" flux pattern illustrated in FIG. 6 and by the lower flux loop in FIG. 4.

To de-energize coil 25 and energize the coil 24 with current $I_r$ flowing in the reverse direction, the switch SB1 is opened and switch SA2 is closed. This produces the "third" flux pattern illustrated in FIG. 7 and by the upper flux loop in FIG. 4. For the "fourth" flux pattern illustrated in FIG. 8 and by the lower flux loop in FIG. 3, the switch SA2 is opened and switch SB2 is closed. This energizes the coil 25 with current $I_r$ flowing in the reverse direction, while de-energizing coil 24.

Thus, it can be seen that by closing the four switches SA1, SA2, SB1, and SB2 one at a time, with the other three switches always being open, the four flux patterns illustrated in FIGS. 3-8 can be produced to step the rotor 10 in 15° increments. The sequence of switch closures required to produce this sequential stepping action is illustrated in the following table, in which an "x" represents a switch closure:

| STEP NO. | ACTUATED SWITCH | | | |
| --- | --- | --- | --- | --- |
|  | SA1 | SA2 | SB1 | SB2 |
| 0 | x | | | |
| 1 | | | x | |
| 2 | | x | | |
| 3 | | | | x |
| 4 | x | | | |
| 5 | | | x | |
| 6 | | x | | |

To drive the rotor in the opposite direction, the sequence of switch closures in the above table is simply reversed.

Figure 10:
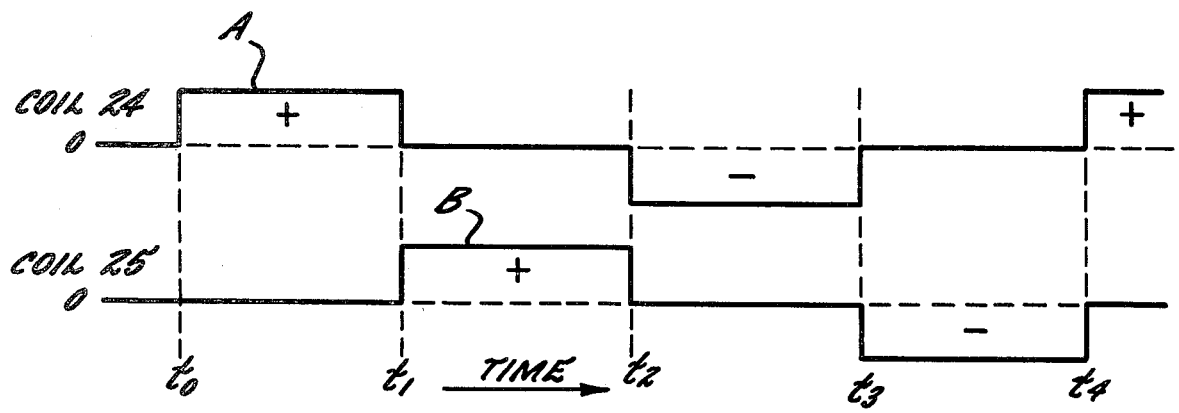
FIG. 10 is a pair of waveforms illustrating a first exemplary energization and de-energization pattern for the two coils in the step motor of FIG. 1.

The pattern of coil excitation produced by the switching sequence described above is illustrated by the waveforms in FIG. 10 as a function of time. It will be noted that a separate waveform is illustrated for each of the two coils 24 and 25, and a "+" region in either waveform represents current flow in one direction, e.g., $I_f$, and a "−" region represents current flow in the opposite direction, e.g., $I_r$. Thus, waveform A indicates that coil 24 is first energized with current flow $I_f$ during the time interval $t_0$ to $t_1$. As indicated by waveform B, coil 25 is de-energized during the interval $t_0$ to $t_1$. At time $t_1$, coil 24 is de-energized, and coil 25 is energized with current flow $I_f$ from time $t_1$ to $t_2$. At this point, coil 25 is de-energized (waveform B) and coil 24 is re-energized with current flow $I_r$ from time $t_2$ to $t_3$ (waveform A). Coil 24 is then de-energized again at time $t_3$ (waveform A), and coil 25 is re-energized with current flow $I_r$ from time $t_3$ to $t_4$ (waveform B). It will be appreciated that the rotor advances in successive steps of 15° each at the beginning of each of the intervals $t_0$–$t_1$, $t_1$–$t_2$, $t_2$–$t_3$, and $t_3$–$t_4$.

Figure 11:
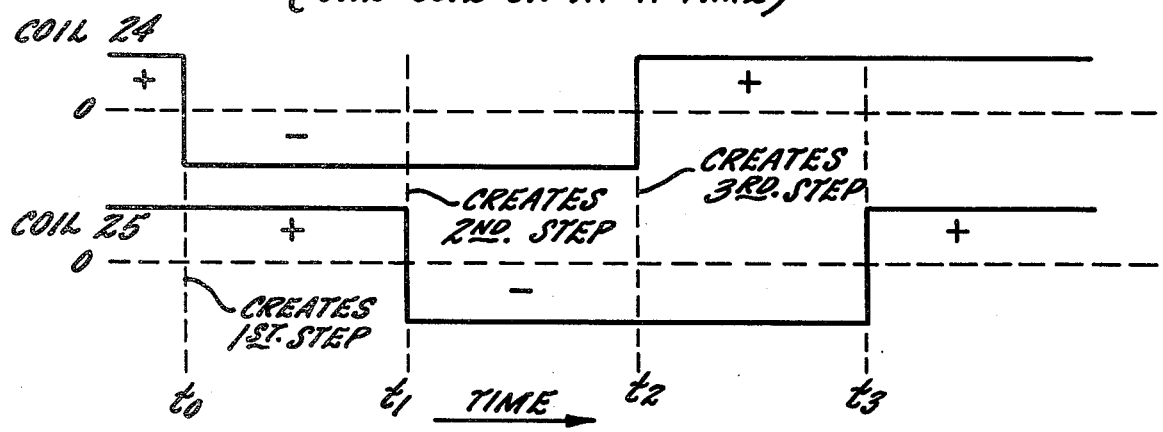
FIG. 11 is a pair of waveforms illustrating an exemplary energization and de-energization pattern for a modified embodiment of the invention.

A modified excitation pattern is illustrated in FIG. 11 for a variation of the invention in which the two sets of axially spaced pole teeth are in circumferential alignment with each other, rather than being offset by one-half tooth pitch. In this case, the two sets of pole teeth are both energized at the same time but with staggered polarities, and the stable "detent" position of the rotor 10 is always a position where the PM regions 40 are located midway between (in the circumferential direction) the pole teeth on opposite sides thereof. Thus, referring to FIG. 11, from time $t_0$ to $t_2$, coil 24 is energized with current flow $I_r$ to produce south poles on the outside teeth 31a and north poles on the inside teeth 31a. During the interval from time $t_0$ to $t_1$, coil 25 is energized with current flow $I_f$ to produce north poles on the outside teeth 33a and south poles on the inside teeth 34a. Thus the rotor will be positioned with the PM regions 40 in circumferential alignment with the stator pole teeth because each axially opposed pair of teeth have opposite polarities.

At time $t_1$, the excitation of coil 24 remains unchanged, but the current flow through coil 25 is reversed from $I_f$ to $I_r$, thereby producing south poles on the outside teeth 33a and north poles on the inside teeth 34a. This causes the rotor to step 15° to a new stable position where the PM regions 40 are in circumferential alignment with the spaces between the stator pole teeth because each axially opposed pair of teeth have the same polarity. With this polarization pattern, the opposed magnetic forces on the rotor 10 are in equilibrium when the PM regions are aligned with the spaces between the pole teeth.

At time $t_2$, the energization of coil 25 remains unchanged, but the current flow is reversed from $I_r$ to $I_f$ in coil 24, thereby producing north poles on the outside teeth 31a and south poles on the inside teeth 32a. Thus, the axially opposed pairs of stator teeth once again have opposite polarities, thereby causing the rotor to step another 15° to a new stable position where the PM regions 40 are again in circumferential alignment with the stator pole teeth.

At time $t_3$, coil 24 continues to be energized with current flow $I_f$, and the current flow through coil 25 is reversed from $I_r$ to $I_f$, thereby changing the polarity of the teeth 33a, 34a from S-N to N-S and stepping the rotor another 15°. In this new stable position of the rotor, the PM regions 40 are again in circumferential alignment with the spaces between the stator pole teeth because the axially opposed pairs of teeth again have the same polarity. The stepping movement continues in this manner as long as the staggered energization pattern of FIG. 11 continues.

While the invention has been described with specific reference to the use of the ring carrying the permanent magnets as a rotor, and the use of the two pairs of interdigital pole teeth as parts of the stator, it should be noted that the roles of these elements can be reversed. Thus, the ring 41 carrying the permanent magnets can be journaled on the shaft 12 and fixed to the non-magnetic spacer 26 so that it functions as a stator, with the two pairs of interdigital pole teeth being keyed to the shaft 12 to function as the rotor.

As can be seen from the foregoing detailed description, this invention provides an improved step motor which offers a relatively high output torque for any given outside diameter or volume. This improved motor can be mass produced at a relatively low cost, and without the use of complex tooling because of the relatively simple design of the various components. The improved motor also provides positive detenting when the motor is turned off, so that the motor maintains its output shaft at the same position held by the shaft just before the motor is turned off. Together with its simple construction, the motor has a long operating life.

I claim as my invention:

1. A step motor comprising
  a rotor member and a stator member aligned on a common axis,
  one of said members having two pairs of interdigital pole teeth extending perpendicularly to said axis, said two pairs of pole teeth being axially spaced from each other with the inner pole teeth in each pair spaced both radially and circumferentially from the outer pole teeth in that pair,
  a pair of coils each of which is associated with one of said pairs of interdigital pole teeth for magnetizing the inner and outer pole teeth in that pair with opposite polarities when the coil is energized, and
  the other of said members having multiple permanent magnets spaced circumferentially from each other and located axially between said two pairs of interdigital pole teeth so that energization of either coil draws said permanent magnets into register with a selected pair of interdigital pole teeth, said permanent magnets being polarized in the axial direction with each adjacent pair of said permanent magnets being polarized in opposite directions.

2. A step motor as set forth in claim 1 wherein the pole teeth in one of said pairs are circumferentially offset from the pole teeth in the other pair.

3. A step motor as set forth in claim 2 wherein said circumferential offset is one-half pole pitch.

4. A step motor as set forth in claim 1 wherein the stator member has said two pairs of interdigital pole teeth, and the rotor member has said multiple permanent magnets.

5. A step motor as set forth in claim 1 wherein said two pairs of interdigital pole teeth have the same number of pole teeth, and the number of said permanent magnets is also the same as the number of interdigital pole teeth in each of said pairs.

6. A step motor as set forth in claim 1 which includes means for alternately energizing said coils so that only one coil is energized at any given time, and for energizing each coil in alternate directions so that the interdigital pole teeth associated therewith are magnetized with alternating polarities.

7. A step motor as set forth in claim 1 wherein each of said pairs of interdigital pole teeth is formed by two flat annuli with one annulus forming the inner pole teeth and the other annulus forming the outer pole teeth.

8. A step motor as set forth in claim 1 wherein each of said coils has an annular configuration with the inside surface of the annulus being magnetically coupled to the associated inner pole teeth, and the outer surface of the annulus being magnetically coupled to the associated outer pole teeth.

9. A step motor as set forth in claim 1 which includes a non-magnetizable spacer separating said two pairs of interdigital pole teeth in the axial direction so that any magnetic flux passing between said two pairs of pole teeth must pass through said permanent magnets therebetween.

10. A step motor as set forth in claim 1 wherein said multiple permanent magnets are formed by magnetized zones in a unitary ceramic member.

11. A step motor comprising
  a rotor member and a stator member aligned on a common axis,
  one of said members having two pairs of interdigital pole teeth extending perpendicularly to said axis, said two pairs of pole teeth being axially spaced from each other with the inner pole teeth in each pair being both radially and circumferentially spaced from the outer pole teeth in that pair, the pole teeth in one of said pairs being circumferentially offset from the pole teeth in the other pair,
  a pair of coils each of which is associated with one of said pairs of interdigital pole teeth for magnetizing the inner and outer pole teeth in that pair with opposite polarities when the coil is energized, and
  the other of said members having multiple permanent magnets spaced circumferentially from each other and located axially between said two pairs of interdigital pole teeth so that energization of either coil draws said permanent magnets into register with a selected pair of interdigital pole teeth, said permanent magnets being polarized in the axial direction.

12. A step motor as set forth in claim 11 wherein said circumferential offset is one-half tooth pitch.

13. A step motor as set forth in claim 11 wherein each adjacent pair of said permanent magnets are polarized in opposite directions.

14. A step motor as set forth in claim 11 wherein the stator member has said two pairs of interdigital pole teeth, and the rotor member has said multiple permanent magnets.

15. A step motor as set forth in claim 11 wherein said two pairs of interdigital pole teeth have the same number of pole teeth, and the number of said permanent magnets is also the same as the number of interdigital pole teeth in each of said pairs.

16. A step motor as set forth in claim 11 which includes means for alternately energizing said coils so that only one coil is energized at any given time, and for energizing each coil in alternate directions so that the interdigital pole teeth associated therewith are magnetized with alternating polarities.

17. A step motor as set forth in claim 11 wherein each of said pairs of interdigital pole teeth is formed by two flat annuli with one annulus forming the inner pole teeth and the other annulus forming the outer pole teeth.

18. A step motor as set forth in claim 11 wherein each of said coils has an annular configuration with the inside surface of the annulus being magnetically coupled to the associated inner pole teeth, and the outer surface of the annulus being magnetically coupled to the associated outer pole teeth.

19. A step motor as set forth in claim 11 which includes a non-magnetizable spacer separating said two pairs of interdigital pole teeth in the axial direction so that any magnetic flux passing between said two pairs of pole teeth must pass through said permanent magnets therebetween.

20. A step motor as set forth in claim 11 wherein said multiple permanent magnets are formed by magnetized zones in a unitary ceramic member.

21. In a stepping motor having first and second major components rotatable relative to one another about an axis, one of said components being a stator and the other being a rotor, the improvement comprising, said first component comprising axially spaced electromagnetic units each having an annular shell of magnetizable material surrounding an annular coil,
the opposed faces of said units lying in axially spaced planes which are substantially perpendicular to said axis and being formed by two flat annuli forming interdigital pole teeth separated circumferentially by radially-lengthwise gaps and radially by circumferentially-lengthwise gaps,
the teeth of said units being circumferentially offset by one-half pole pitch such that the centers of the teeth in the first unit are aligned with the radially-lengthwise gaps in the second unit,
said second component comprising a member disposed radially of said axis and lying between and adjacent to said opposed faces,
said member having permanently magnetized portions spaced circumferentially about said axis and lying radially aligned with said pole teeth, said magnetized portions being magnetized in a direction parallel to said axis and with alternate ones of such portions being oppositely polarized.

22. In a stepping motor having a stator and a rotor rotatable relative to one another about an axis, the improvement comprising, said stator including two axially spaced electromagnetic units each having a cylindrical shell of magnetizable material surrounding a coil, each unit being disposed about the axis with the turns of its coil running circularly about the axis,
said units having opposed, axially spaced flat end faces lying in planes perpendicular to said axis and formed by radially inner and outer annuli with radially extending circularly spaced poles, the first and second sets of poles of the respective annuli lying in interdigital relation to define and be separated in a circular direction by radially lengthwise first gaps and to define and be separated in a radial direction by second gaps,
the poles of said units being circumferentially offset about said axis such that the centers of poles in the first unit are aligned with the radially-lengthwise gaps of the second unit,
said rotor comprising a member disposed radially of said axis and axially between said end faces, said rotor having permanent magnets circumferentially spaced about said axis at a multiple (including unit) of the pitch of said poles and disposed with their opposite axial ends adjacent said respective flat end faces to define a working flux gap,
said magnets being permanently magnetized in a direction parallel to said axis and alternate ones with opposite polarity, whereby energization of either one of said coils produces magnetic flux which passes from one set of poles of the end face associated with the one coil through the adjacent permanent magnets and back to the other set of poles of that end face, thereby attracting said rotor to align the permanent magnets with said poles.

* * * * *